United States Patent
Hill et al.

(10) Patent No.: US 7,634,347 B2
(45) Date of Patent: Dec. 15, 2009

(54) REFUELLING SYSTEM AND METHOD

(75) Inventors: David Hill, Commerce Township, MI (US); Saurin Mehta, Troy, MI (US)

(73) Assignee: Inergy Automotive Systems Research, Brussels (BE)

( * ) Notice: Subject to any disclaimer, the term of this patent is extended or adjusted under 35 U.S.C. 154(b) by 381 days.

(21) Appl. No.: 11/718,140

(22) PCT Filed: Oct. 27, 2005

(86) PCT No.: PCT/EP2005/055618

§ 371 (c)(1),
(2), (4) Date: Apr. 27, 2007

(87) PCT Pub. No.: WO2006/045839

PCT Pub. Date: May 4, 2006

(65) Prior Publication Data

US 2009/0150041 A1    Jun. 11, 2009

Related U.S. Application Data

(60) Provisional application No. 60/622,621, filed on Oct. 28, 2004.

(51) Int. Cl.
*F02M 3/04* (2006.01)
(52) U.S. Cl. ...................... 701/102; 123/520
(58) Field of Classification Search ............ 701/102, 701/123, 101; 123/520, 519, 198 D, 516
See application file for complete search history.

(56) References Cited

U.S. PATENT DOCUMENTS

| | | | |
|---|---|---|---|
| 4,611,287 A | * | 9/1986 | Kobayashi et al. .......... 701/123 |
| 4,862,856 A | | 9/1989 | Yokoe et al. |
| 4,887,578 A | * | 12/1989 | Woodcock et al. .......... 123/519 |
| 5,931,141 A | | 8/1999 | Chino |
| 6,488,015 B2 | | 12/2002 | Isobe |
| 6,516,835 B2 | | 2/2003 | Enge |
| 6,578,417 B1 | | 6/2003 | Eck |
| 6,601,617 B2 | | 8/2003 | Enge |
| 2002/0153374 A1 | | 10/2002 | Isobe |

(Continued)

FOREIGN PATENT DOCUMENTS

EP    0 790 144    8/1997

OTHER PUBLICATIONS

U.S. Appl. No. 12/162,439, filed Dec. 1, 2008, Behar, et al.

(Continued)

*Primary Examiner*—Hieu T Vo
(74) *Attorney, Agent, or Firm*—Oblon, Spivak, McClelland, Maier & Neustadt, L.L.P.

(57) ABSTRACT

A refuelling system for a vehicle having a combustion engine. The refuelling system includes: a fuel tank; a canister configured to adsorb fuel vapor generated inside the fuel tank; a canister drain cut valve coupled to the canister and configured to discharge air; an ignition sensor configured to detect whether the ignition of the combustion engine is switched on or off; and a refuelling controller configured to open the canister drain cut valve when the ignition sensor detects that the ignition of the combustion engine is switched off. A method for refuelling a motor vehicle can use the refuelling system.

10 Claims, 2 Drawing Sheets

U.S. PATENT DOCUMENTS

2006/0231138 A1* 10/2006 Devall .................. 137/202

OTHER PUBLICATIONS

Figure 1:
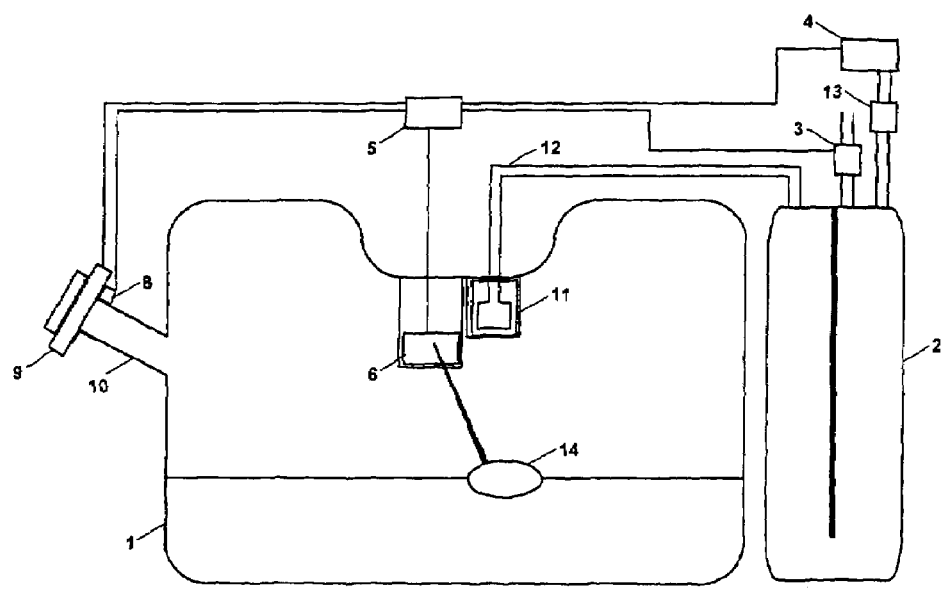

U.S. Appl. No. 12/298,846, filed Oct. 28, 2008, Grant, et al.
U.S. Appl. No. 12/162,207, filed Oct. 9, 2008, Hill, et al.
U.S. Appl. No. 12/064,333.
U.S. Appl. No. 12/064,351.
U.S. Appl. No. 10/582,798, filed Jun. 14, 2006, Hill.
U.S. Appl. No. 11/587,529, filed Oct. 25, 2006, Hill, et al.
U.S. Appl. No. 11/813,544, filed Jul. 9, 2007, Hill.
U.S. Appl. No. 11/816,677, filed Aug. 20, 2007, Wouters, et al.
U.S. Appl. No. 11/910,343, filed Oct. 1, 2007, Hill, et al.

* cited by examiner

REFUELLING SYSTEM AND METHOD

CROSS-REFERENCE TO PRIOR APPLICATIOTS

The present patent document claims priority to U.S. provisional application 60/622,621 file Oct. 28, 2004, the entire contents of which are hereby incorporated herin by reference.

The present invention relates to a refuelling system and to a method for refuelling the fuel tank of a motor vehicle. More specifically, the present invention relates to a refuelling system that is safe, accurate and simple in construction thereby decreasing manufacturing costs, while enabling easy refuelling.

It is known that the fuel contained in a fuel tank tends to evaporate at ambient temperature and forms a fuel vapour/air mixture filling the headspace of the fuel tank above the surface of the liquid fuel. When most of the fuel has been consumed due to combustion in the engine, the headspace above the surface of the liquid fuel in the tank is comparably large and therefore, a corresponding volume of the fuel vapour/air mixture has filled the headspace of the fuel tank. During refuelling, however, nearly the entire volume of the fuel vapour/air mixture is replaced by liquid fuel and the fuel vapour/air mixture must escape from the fuel tank somehow to prevent an increase of the pressure within the fuel tank. Usually, the fuel vapour/air mixture is allowed to escape from the fuel system through a vent valve.

Increasingly stringent environmental standards have resulted in regulations which necessitate a significant reduction in fuel vapours escaping from a vehicle during refuelling. These regulations generally strive to essentially eliminate fuel vapour escaping to the atmosphere during refuelling. Therefore, in current conventional automobile refuelling systems, a float style valve is generally used to vent the fuel tank during refuelling. As this valve is submerged in fuel, its float rises, this ultimately seals the fuel tank off so that it can not vent, consequently sending fuel up the fill pipe and tripping the aspirator in the fill nozzle. This type of venting valve has a multitude of names, such as Control Valve (CV), or Fuel Level Vent Valve (FLVV). Control valves generally are rather expensive, due to the number of complex materials needed to create the floats used in the valves. In addition, because the valves are made to control the refuelling function, they are submerged in fuel whenever the tank is nearly full. Due to their size, these valves have a certain lack of responsiveness that allows liquid to pass into the vapour path to the carbon canister, consequently contaminating the canister. In the past, a few different methods have been looked at to solve that problem.

One such method is disclosed in U.S. Pat. No. 6,516,835 which describes a tank mounted solenoid valve that is actuated based on signals from tank mounted sensors, such as the level sensor. When the level sensor indicates that the tank is full, the valve shuts, causing a pressure spike in the tank thus ending the refuelling process. The advantage to this system is that the valve can stay in the normally closed position at all times, leaving only small orifice vent valves for dealing with dynamic pressure generation while the vehicle is running. As a result, the amount of vapour that can flow to the vapour recovery canister is limited, allowing the canister to be smaller. As mentioned above, by removing the control valve, the risk of liquid carryover into the vapour recovery canister is greatly reduced. The downside to this system is the additional sensors and valves required to perform the refuelling functions. These items add additional cost to the system.

U.S. Pat. No. 6,488,015 describes a system that uses the Canister Vent Solenoid or Drain Cut Valve, to control the refuelling process. The system uses the vehicle speed sensor to determine if the vehicle is stopped. Once stopped, the Drain Cut Valve will close if the fuel level in the tank is above a prescribed height. The valve remains closed for a prescribed amount of time to allow pressure to build in the tank forcing fluid up the fill pipe and ultimately shutting off the fill nozzle. If after five seconds, the fuel level in the tank is below a prescribed level, the valve opens again allowing for more refuelling. Once the fuel level reaches a prescribed level, the cut valve closes and ends the refuelling process. This system is effective; however there are a few concerns. First, by using the vehicle speed sensor, refuelling can be permitted during an engine on condition. Second, the system is based on a resistor card type fuel level gauge. Based on the poor accuracy of these gauges, consistent fill volumes could be difficult.

In view of the above, there exists a need for an improved refuelling system that overcomes the disadvantages in the prior art. In particular, the refuelling system should be simple in construction, accurate and safe.

The inventors of the present invention have found that this technical problem can be solved by the subject matter of the present claims, i.e. by a refuelling system for a vehicle having a combustion engine, the refuelling system comprising:
  a fuel tank;
  a canister which is adapted to adsorb fuel vapour generated inside the fuel tank;
  a canister drain cut valve coupled to the canister and adapted to discharge air;
  an ignition sensor adapted to detect whether the ignition of the combustion engine is switched on or off; and
  a refuelling controller adapted to open the canister drain cut valve when the ignition sensor detects that the ignition of the combustion engine is switched off, and to close said valve at the end of the refuelling process or if no refuelling occurs.

The main functional differences seen in this system over the one of U.S. Pat. No. 6,488,015 described above is that it is not based on a vehicle speed sensor. By requiring the vehicle to be shut of at the time of refuelling, a large amount of risk is eliminated due to lack of moving part that could potentially produce charge concentrations.

The fuel tank of the system according to the invention is a hollow body made of a material which resists chemically to fuels, like a metal a polymeric material. The invention gives good results with fuel tanks made of polymeric material. The polymeric material is preferably selected from the group consisting of polyethylene, polyethylene terephthalate, polybutylene terephthalate, polyamide, polyoxymethylene, polypropylene, elastomers and mixtures of two or more thereof. Preferably, the polymeric material comprises high density polyethylene (HDPE). In a specific embodiment, the hollow element also comprises a layer of barrier material like EVOH (at least partially hydrolysed ethylene—vinyl acetate copolymers). Alternatively, the HDPE may be surface treated (by fluorination, sulphonation or the like) in order to reduce its permeability to fuel.

As explained above, the main characteristic of the present invention is related to the presence of an ignition sensor which is connected to a controller which only opens the drain cut valve (and hence, allows effective venting for the refuelling event) when the engine is switched off, and is adapted to close it again at the end of the refuelling process or if no refuelling occurs. The above mentioned controller may either be the Engine Control Unit (ECU), or a separate ECU designed to control functions only related to the fuel system. The end of refuelling or the no refuelling event may be determined by the use of a level sensor and a timer which will detect if the level sensor is stationary for a predetermined period of time.

The system according to the invention comprises a canister which is connected, through vapour lines, to the fuel tank in a way such that the fuel vapour/air mixture from the tank is channeled into the canister and adsorbed or partially condensed in the charcoal. The vapour line in such a system is connected to an inlet port located at the top of the canister. A second port on the canister is also provided, known as a "purge" port, from which a line extends to the intake manifold or carburettor of the vehicle's engine. When the engine is running, at a preset frequency, condensed fuel and vapour that is stored in the charcoal is released and sucked into the engine, to be burned.

The canister according to the invention also comprises a third port which is connected to the atmosphere through a canister drain cut valve. When this valve is closed at the end of the refuelling process, the tank can be effectively sealed, such that no vapour can escape to the atmosphere, causing fuel to back fill up the filler pipe ultimately ending the refuelling process.

The fuel vapour adsorbent material inside the canister according to the invention can be any absorbent. It is preferably charcoal, either pure, granular, pelletized or supported on an adequate support. It may also be agglomerated charcoal in the form of a honeycomb for instance.

As explained above, it is preferred (in order to downsize the canister) to have the venting valve closed when no refuelling occurs. Therefore, in one embodiment of the present invention, the refuelling system comprises a filler door with a filler door sensor adapted to detect whether the filler door is open or closed. The controller according to that embodiment is then adapted to first open the venting valve when the engine shuts off, but to close it again if or when the filler door closes.

In fuel systems using an OBD (On Board Diagnosis including leak detection tests), usually, when the engine switches off, the CPU (central computer programmed control unit of the engine) starts a leak detection test by closing all valves including the venting valve. Accordingly, the refuelling system of the present invention would not be compatible with such fuel systems since the leak test at engine shut off would always be aborted (the venting valve being open), even in the case no refuelling occurs.

Therefore, according to a first preferred embodiment of the present invention, the refuelling controller is adapted to close the canister drain cut valve after a prescribed period of time t has elapsed, during which both the ignition sensor continuously detects that the ignition is switched off and the filler door sensor continuously detects that the filler door is closed (typical case of engine shut off without refuelling). Once the drain cut valve has been closed and the engine is still switched off, the CPU can start the regular leak detection test Usually, the time t is in the range of the minutes, typically in between 1 and 10 minutes, preferably within 2 and 8, more preferably between 3 and 6 minutes.

On the other hand, it would be better to close the venting valve when the tank is at (almost) full state in order to avoid liquid entrainment to the canister. Therefore, according to a second preferred embodiment, the refuelling system according to the invention comprises additionally a fuel level detecting device to detect the fuel level inside the fuel tank. More preferably, this device uses a contact-less level sensor, which is more accurate than a conventional resistor card level sensor. Preferred contact-less level sensors are those based on weighing or inductive or Hall effects. The latter give good results. In such systems, the refuelling controller is adapted to close the canister drain cut valve when the fuel level detected by the fuel level detecting device reaches a prescribed height h. This height generally corresponds to the maximum fuel level allowed in the tank.

The present invention also concerns a method for refuelling a motor vehicle using a refuelling system as described above, said method comprising the steps of:
  detecting whether the ignition of the combustion engine is switched on or off using the ignition sensor;
  opening the canister drain cut valve through the refuelling controller when the ignition of the combustion engine is switched off.

As mentioned above, it is preferable to close said valve again through the controller after refuelling or when no refuelling occurs.

Therefore, the method preferably comprises the additional step of detecting whether the filler door of the fuel tank is open or closed. This step then conditions in fact the closing of the drain cut valve by the controller and it is performed using the filler door sensor describes above. In this embodiment, the non refuelling event is detected by this sensor both if no refuelling occurs or if refuelling took place but is finished.

According to a more preferred embodiment, in order to reduce the time during which the venting valve remains open while allowing the driver to perform refuelling if required and/or allowing leak detection in the case of engine shut off without refuelling, the method according to the invention preferably comprises the additional step of closing the canister drain cut valve when the filler door is and remains closed for at least a period of time t (either after engine shut off or after closing the filler door when refuelling is finished).

Finally, according to another preferred embodiment, in order to avoid liquid entrained in the canister at (almost) full tank level, the method comprises the additional steps of:
  if the filler door is open, detecting the fuel level inside the fuel tank; and
  closing the canister drain cut valve when the fuel level reaches a prescribed height h.

Preferably, the height h is the one corresponding to the full tank level. It is worth noting in that regard that the system and the controller could be adapted as described in U.S. Pat. No. 6,488,015 i.e. to use 2 pre-described levels.

Figure 2:
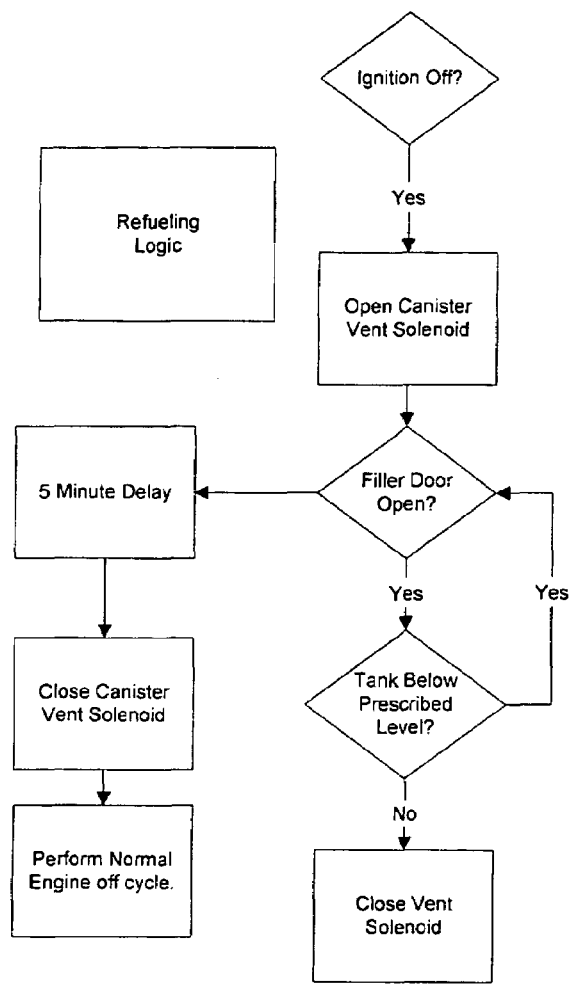

The system and method according to the present invention are illustrated in a non limitative way respectively by FIGS. 1 and 2.

FIG. 1 shows a preferred embodiment of the refuelling system according to the invention. The refuelling system comprises a fuel tank (1) which is equipped with a filler pipe (10) having a filler door (9) at its end. The filler door (9) comprises a filler door sensor (8) adapted to detect whether the filler door (9) is open or closed. The system comprises one or more rollover valves (11) on the fuel tank (1). A canister (2) is in vapour communication with the fuel tank (1). via a vapour conduit (12) and is adapted to adsorb fuel vapour generated inside the fuel tank (1). The canister (2) is also in communication with the engine intake manifold via a purge solenoid (13) and selectively in communication with the atmosphere via a canister drain cut valve (3), also referred to as a canister vent solenoid, coupled to the canister (2) and adapted to discharge air. By using the canister drain cut valve (3), the fuel tank (1) can be effectively sealed, such that no fuel vapour can escape to the atmosphere, causing fuel to back fill up the filler pipe (10) ultimately ending the refuelling process. A contact-less fuel level detecting device (6) with a float arm (14) is capable of detecting the amount of fuel in the fuel tank (1). The system also includes an ignition sensor (4) adapted to detect whether the ignition of the combustion engine is switched on or off, and a refuelling controller (5)

adapted to open the canister drain cut valve (3) when the ignition sensor (4) detects that the ignition of the combustion engine is switched off. The refuelling controller (5) is adapted to close the canister drain cut valve (3) when the fuel level detected by the fuel level detecting device (6) reaches a prescribed height (maximum fuel level, non illustrated). Additionally, the refuelling controller (5) is adapted close the canister drain cut valve (3) when during a prescribed period of time, the ignition sensor (4) continuously detects that the ignition is switched off and the filler door sensor (8) continuously detects that the filler door (9) is closed.

FIG. 2 describes the basic process flow. When the engine shuts off, the refuelling program begins by opening the vent (drain cut valve) to bleed pressure, and then by checking for the fuel door opening for a prescribed amount of time. If the fuel door opens within the allotted time (5 minutes for instance, as illustrated), the refuelling process continues, at which point the computer communicates with the level sensor and the filler door until the filler door closes or the tank reaches a prescribed level, at which point the canister vent solenoid shuts, ending the refuelling process. If the fuel door does not open within the allotted time, then the controller closes the vent valve and starts to perform the normal engine off cycle (leak detection test).

The invention claimed is:

1. A refuelling system for a vehicle having a combustion engine, the refuelling system comprising:
   a fuel tank;
   a canister configured to adsorb fuel vapor generated inside the fuel tank;
   a canister drain cut valve coupled to the canister and configured to discharge air;
   an ignition sensor configured to detect whether an ignition of the combustion engine is switched on or off; and
   a refuelling controller configured to open the canister drain cut valve when the ignition sensor detects that the ignition of the combustion engine is switched off.

2. The refuelling system according to claim 1, wherein the fuel tank comprises a filler door with a filler door sensor configured to detect whether the filler door is open or closed.

3. The refuelling system according to claim 2, wherein the refuelling controller is configured to close the canister drain cut valve after a prescribed period of time has elapsed, during which:
   the ignition sensor continuously detects that the ignition is switched off, and
   the filler door sensor continuously detects that the filler door is closed.

4. The refuelling system according to claim 1, further comprising a fuel level detecting device configured to detect the fuel level inside the fuel tank.

5. The refuelling system according to claim 4, wherein the fuel level detecting device includes a contact-less level sensor.

6. The refuelling system according to claim 4, wherein the refuelling controller is configured to close the canister drain cut valve when the fuel level detected by the fuel level detecting device reaches a prescribed height.

7. A method for refuelling a motor vehicle using a refuelling system according to claim 1, the method comprising:
   detecting whether the ignition of the combustion engine is switched on or off using the ignition sensor; and
   opening the canister drain cut valve through the refuelling controller when the ignition of the combustion engine is switched off.

8. The method according to claim 7, the method further comprising detecting whether the filler door of the fuel tank is open or closed.

9. The method according to claim 8, wherein the controller closes the canister drain cut valve when the filler door is and remains closed for at least a period of time.

10. The method according to claim 8, the method further comprising:
    if the filler door is open, detecting the fuel level inside the fuel tank; and
    closing the canister drain cut valve when the fuel level reaches a prescribed height.

* * * * *